March 24, 1970  H. G. BUSIGNIES  3,502,347

APPARATUS FOR VEHICLE SUSPENSION CONTROL

Filed Nov. 6, 1967

INVENTOR
HENRI G. BUSIGNIES
BY
ATTORNEY

United States Patent Office 3,502,347
Patented Mar. 24, 1970

3,502,347
APPARATUS FOR VEHICLE SUSPENSION CONTROL
Henri G. Busignies, Montclair, N.J., assignor to International Telephone and Telegraph Corporation, Nutley, N.J., a corporation of Maryland
Filed Nov. 6, 1967, Ser. No. 680,792
Int. Cl. B60g 9/00
U.S. Cl. 280—124                                    10 Claims

ABSTRACT OF THE DISCLOSURE

To the body of a car which is normally suspended through a spring, there is provided apparatus comprising pneumatic or hydraulic equipment which is controlled by electronic means and mounted in parallel to the normal spring system.

BACKGROUND OF THE INVENTION

In general this invention relates to apparatus for maintaining a constant pressure or force between the frame of the vehicle and each wheel, and in particular, to pneumatic or hydraulic equipment connected in parallel to a normal spring system and controlled by electronic means.

SUMMARY OF THE INVENTION

An object of this invention is to provide apparatus for maintaining a constant pressure or force between the frame of the vehicle and each wheel.

According to the broader aspects of this invention, the apparatus comprises means for maintaining a constant pressure or force between each wheel and its frame, first actuated by means for sensing the wheel displacement relative to the frame, means responsive to said displacement for coupling a high pressure source to said maintaining means, second means for sensing the amount of high pressure fluid coupled to said maintaining means, and means for comparing said first and second means and controlling said responsive means.

BRIEF DESCRIPTION OF THE DRAWINGS

This invention will be described by reference to the accompanying drawings, in which.

DESCRIPTION OF THE PREFERRED EMBODIMENT

This description will be limited to the suspension around one of the wheels W of the vehicle and to a typical realization of the main idea involved.

It will be assumed in this description that the body of the car is normally suspended through a spring and that the additional equipment needed to fulfill the main idea of the invention consists of a pneumatic or hydraulic equipment controlled by electronic means and mounted in parallel with the normal spring system.

For the simplicity of explanations it will be assumed that the system is an "open pneumatic" system, i.e. that there is a high pressure tank but no low pressure tank, so that the fluid "air" returns to the atmosphere after use.

Figure 1:
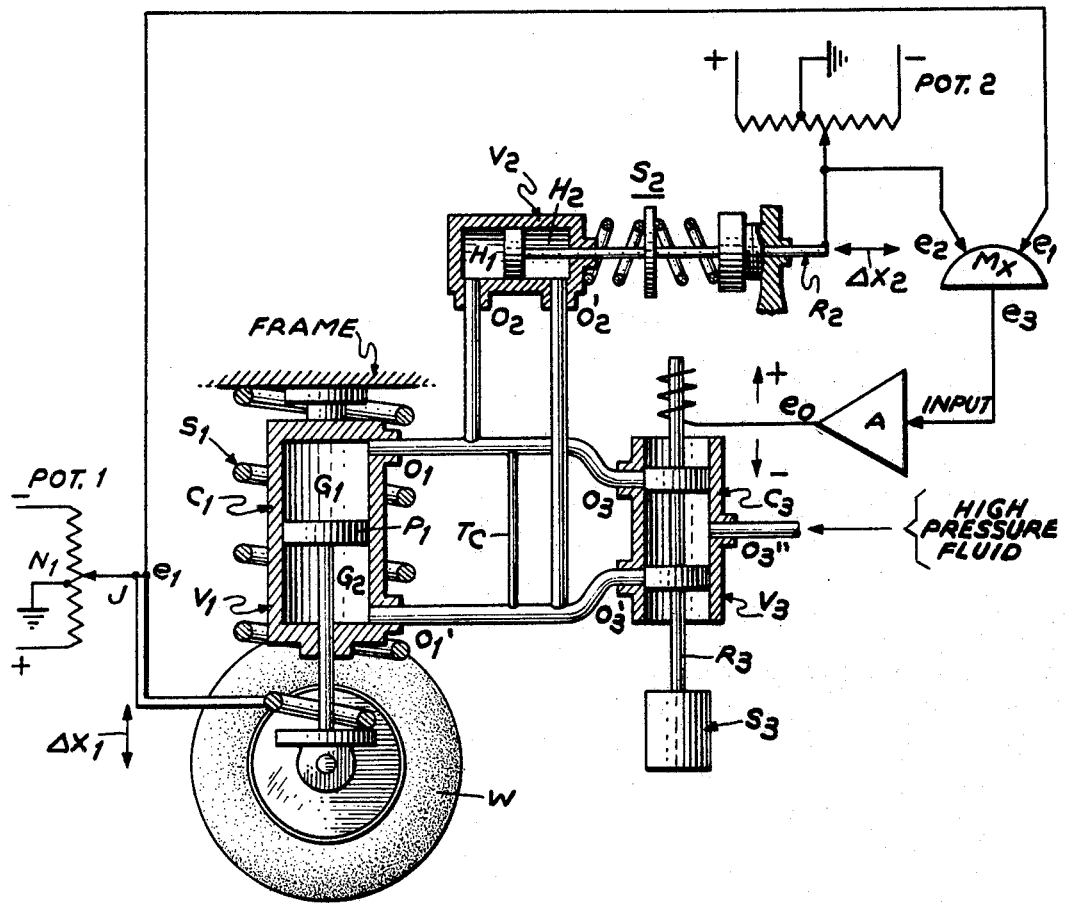
FIGURE 1 shows an embodiment according to the invention.

Referring to FIGURE 1, the spring $S_1$ represents the normal spring to which the weight of the frame is applied. Consequently, there is no difference in pressure between the two sides of piston $P_1$ of valve $V_1$. The arm J of potentiometer $Pot_1$ is located to the middle point $N_1$ of that potentiometer which is $N_1$ which is frame grounded. It will be assumed for the clarity of the present description that the potentiometer $Pot_1$ can be displaced (or rotated) to satisfy that condition. Accordingly there is no voltage output from potentiometer $Pot_1$ and in the absence of transients, the voltage output $e_1$ is equal to zero (at rest).

The upper part $G_1$ and the lower part $G_2$ of cylinder $C_1$ are connected to the valves $V_2$ and $V_3$. A capillary tube $T_c$ connects the upper part $G_1$ to the lower part $G_2$. The role of this capillary tube is to equalize, with a relatively long time constant, the pressure in $G_1$ and $G_2$. This capillary tube could be replaced by an ordinary restrictor (which is more susceptible to blocking by foreign matter) or by an adjustable taper needle valve.

In this particular application instead of using one capillary tube $T_c$ between the upper part $G_1$ and the lower part $G_2$ of cylinder $C_1$, two independent capillary tubes can be used between the atmospheric pressure and the upper part $G_1$ and lower part $G_2$ of the cylinder $C_1$.

Figure 2:
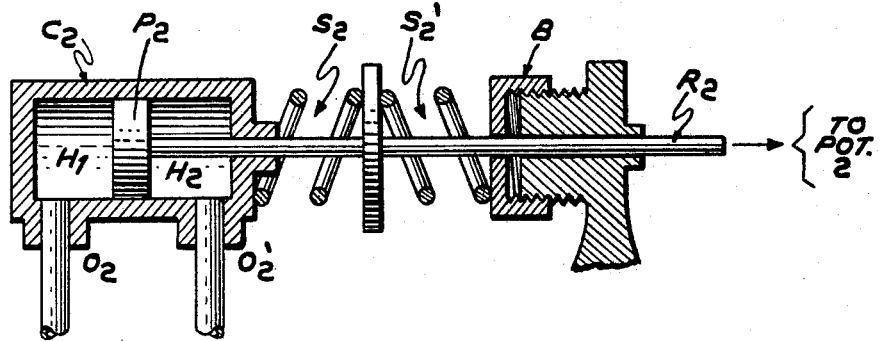
FIGURE 2 is an enlarged view of the spring and valve system, $S_2$ and $V_2$, shown in FIGURE 1.

The valve $V_2$ shown in detail in FIGURE 2, consists of a piston $P_2$ moving in a cylinder $C_2$. The piston, defining spaces H and $H_2$, is connected through a rod $R_2$ to a potentiometer $Pot_2$ and to spring system $S_2$, $S_2'$, and adjusting spring bias means B. The degree of control of the suspension (i.e. the complete or incomplete compensation of the variation of force $\Delta F_1$, by the pneumatic force $\Delta F_p$) can be adjusted by the knob B. There are some correlation factors between the spring constants $S_1$ and $S_2$, between the area and displacements $\Delta X_1$ and $\Delta X_2$ of pistons $P_1$ and $P_2$ between the matching of potentiometers $Pot_1$ and $Pot_2$ as will be shown later.

The valve $V_3$ contains two pistons connected by means of a rod $R_3$ to a spring system $S_3$ maintaining the two pistons in front of the orifices $O_3$ and $O_3'$. The other side of rod $R_3$ is connected to an electromagnetic plunger actuating the rod up and down in relation with the variations of the voltage output $e_0$ from the amplifier A. This amplifier is connected to a mixer $M_1$ receiving the voltages $e_1$ and $e_2$ from potentiometers $Pot_1$ and $Pot_2$.

The high pressure fluid (compressed air) is connected to the orifice $O_3''$ of the valve $V_3$. When the two pistons are actuated up + (or down —), the compressed air is connected in the upper part $G_1$ (or the lower part $G_2$) of cylinder $C_1$ while the lower part $G_2$ (or upper part $G_1$) is connected to the atmospheric pressure through orifice $O_3'$ (or $O_3$) of the cylinder $C_3$.

In the absence of voltage from the output of amplifier A the spring system $S_3$ brings back the two pistons at their resting position (In front of orifices $O_3$ and $O_3'$).

The output voltage of amplifier A is equal to zero when the two voltages $e_1$ and $e_2$ are equal in absolute value and opposite in sign; i.e.

$$|e_1|=|e_2|$$

However, to avoid possible oscillations the mixer $M_x$ can be adjusted so that the output voltage will be equal to zero for $$|e_1|=K|e_2|$$

K being a coefficient of proportionality slightly different from one. (For instance $K=1.1$).

To explain how the system behaves, it will be assumed that under the influence of road irregularities, the spring system $S_1$ takes an elongation $\Delta X_1$ corresponding to a reduction $\Delta F_1$ in the spring tension. Therefore $$-\Delta F_1=K_{S1}\Delta X_1$$

$K_{S1}$ being the spring constant of $S_1$

The displacement $\Delta X_1$ is also applied to the arm of potentiometer $Pot_1$ which will deliver a voltage $e_1$ such as:

$$e_1=N_1\Delta X_1$$

$N_1$ being a constant of proportionality depending on the reference voltage applied to the potentiometer. It will be assumed for simplification that the potentiometer is linear.

The voltage $e_1$ applied to the plunger of valve $V_3$ through mixer $M_X$ and amplifier A causes the rod $R_3$ to raise, causing the high pressure to be applied to the upper part of cylinder $C_1$, while the lower part $G_2$ is connected to the atmospheric pressure. But, at the same time, the valve $V_2$ connected also on the two sides of piston $P_1$ starts to move on the right and the rod $R_2$ moves the arm of potentiometer $Pot_2$ until the voltage output $-e_2$ of that potentiometer reaches a value equal in absolute value to $e_1$. At that point, the output of the mixer $M_X$ will be equal to $$e_1 - e_2 = 0$$

The output of amplifier A will be also equal to zero and the valve $V_3$ will go back to its resting position stopping the flow of fluid into the upper part of cylinder $C_1$. In that condition it is desirable to have across the pneumatic system a pressure $\Delta F_p$ equal and opposite to $\Delta F_1$, so that the total *variation of pressure* between the frame and the wheel system will be equal to zero; i.e.

$$-\Delta F_1 + \Delta F_p = 0 \text{ or } \Delta F_p = \Delta F_1$$

If T is called the total force acting between the frame and the wheel; $F_{S1}$ the force due to the spring $S_1$, and $F_p$ for force due to the pneumatic system then:

$$F_T = F_{S1} + F_p$$

and every time a variation $\pm \Delta F_{S1}$ is obtained, a variation $\mp \Delta F_p$ should also be obtained so that $$F_T = F_{S1} \pm \Delta F_{S1} + F_p \mp \Delta F_p = \text{constant}$$

The relations between the elements can be represented by the following equations.
Since $$|e_1| = N_1 \Delta X_1 (1) \text{ with } \Delta X_1 = \frac{\Delta F_1}{K_{S1}}$$

It is desirable to produce in the pneumatic system a force equal or smaller than $\Delta F_1$. If $P_{11}$ and $P_{12}$ are the pressure in the two sides of piston $P_1$, and $A_1$ is the area of the piston desired $$(P_{11} - P_{12}) A_1 \leq \Delta F_1$$

That gives $\Delta X_1 = \dfrac{(P_{11} - P_{12}) A_1}{K_{S1}}$ (2)

In the valve $V_2$ $-e_2 = N_2 \Delta X_2$ (3), $N_2$ being a constant. If $A_2$ is the area on each face of piston $P_2$, $P_{21}$, $P_{22}$ the pressure, and $K_{S2}$ the spring constant of $S_2$ then on each face of piston $P_2$ and $K_{S2}$ the spring constant of $S_2$ $$\Delta X_2 = \frac{(P_{21} - P_{22}) A_2}{K_{S1}} \quad (4)$$

Since it is desirable that $$|e_1| = |e_2|$$

then dividing (1) by (3):

$$\frac{\Delta X_1}{\Delta X_2} = \frac{N_2}{N_1} \quad (5)$$

This ratio expresses the relation between the constant of the potentiometers for a given ratio between the displacements desired for pistons $P_1$ and $P_2$.

Furthermore, dividing (2) by (4)

$$\frac{\Delta X_1}{\Delta X_2} = \frac{(P_{11} - P_{12}) A_1 K_{S2}}{(P_{21} - P_{22}) A_2 K_{S1}} = \frac{A_1 K_{S2}}{A_2 K_{S1}} \quad (6)$$

This equation expresses the correlation between the area of the pistons and the spring constants when a displacement ratio has been chosen.

EXAMPLE

Assuming a desired displacement $\Delta X_2$ 10 times less than $\Delta X_1$. Then for $\Delta X_1 = 10 \Delta X_2$ Equation 5 gives:

$$N_1 = \frac{N_2}{10}$$

i.e. for the same displacement of the arms of the two potentiometers the voltage should be ten times higher at the output of $Pot_2$ than in $Pot_1$, i.e. $Pot_2$ should be ten times shorter than $Pot_1$.

Now assume that the area $A_2$ of piston $P_2$ is 100 times less than the area $A_1$ of piston $P_1$ Equation 6 gives with $A_1 = 100 A_2$ $$\frac{\Delta X_1}{\Delta X_2} = 10 = \frac{100 A_2 K_{S2}}{A_2 K_{S1}} \text{ or } 0.1 = \frac{K_{S2}}{K_{S1}}$$

or $K_{S2} = 0.1 K_{S1}$. The spring constant $K_{S2}$ of spring $S_2$ should be 10 times less than the spring constant $K_{S1}$ of spring $S_1$.

The ratios between $\Delta X_1$ and $\Delta X_2$ and between $A_1$ and $A_2$ are given only as examples but the choice of these ratios can also include many other considerations such as volume, reliability, attainability, price, etc.

It is obvious that the valves $V_2$ and $V_3$ should be located as close as possible to cylinder $C_1$ to form a compact group. In the example above I have neglected the coefficient K of equation $e_1 = K e_2$, and in that condition, I get a complete compensation very close to oscillation. The coefficient K can be introduced without difficulties into equations above to compensate for 90% of the variations of force in the spring $S_1$.

The damping (shock absorber) of the mainspring $S_1$ has not been represented.

While I have described above the principles of my invention in connection with specific apparatus, it is to be clearly understood that this description is made only by way of example and not as a limitation to the scope of my invention as set forth in the objects thereof.

I claim:

1. A control for a vehicle suspension having a sprung portion including a frame, an unsprung portion including a wheel, and a first spring system connected to the sprung and unsprung portions, comprising:
    means located between the sprung and unsprung portions for maintaining a constant pressure there between;
    first means for producing a first output indicative of the wheel displacement relative to said frame;
    a source of high pressure fluid;
    means responsive to said wheel displacement for coupling said high pressure source to said maintaining means;
    second means for producing a second output representative of the amount of high pressure fluid coupled to said maintaining means; and
    means comparing said first and second outputs, whereby said responsive means is controlled.

2. Apparatus according to claim 1 wherein said maintaining means includes a first expansible chamber means having a first movable piston therein, said maintaining means being connected in parallel with said first spring system and secured to said sprung and unsprung portions.

3. Apparatus according to claim 2 wherein said first means includes a potentiometer having a movable arm, said arm being actuated by the displacement of said wheel.

4. Apparatus according to claim 3 wherein said second means includes a second spring system, a second valve and piston, and a second potentiometer having a movable member coupled to the piston of said second valve and movable thereby.

5. Apparatus according to claim 4 wherein said responsive means includes a third spring system, and a third valve having two pistons, said third spring system being secured to said last named two pistons and responsive to the movement of said wheel to thereby cause the pistons of said third valve to be displaced and permit entrance of said high pressure fluid into said maintaining means, additional coupling means connecting said third valve to said second valve, such that the pressure or force in said first valve is maintained, and said second valve causes said second potentiometer to produce said second output.

6. Apparatus according to claim 5 wherein said means for comparing said first and second outputs includes a mixer having an input from said first means and an input from said second sensing means, whereby the mixer output is coupled to an amplifier whose output is used to electromechanically control the pistons of said third valve.

7. Apparatus according to claim 6, wherein said responsive means further includes a series of tubes for directing said fluid from said third valve to said first and second valve, and a capillary tube connected between a pair of tubes in said series to equalize, with a relatively long time constant, the pressure in said first valve.

8. Apparatus according to claim 1 in which:
said maintaining means includes a first valve having a piston $P_1$ mounted in parallel with a spring $S_1$ in said first spring system;
said first means includes a potentiometer $Pot_1$; and
said second means includes a spring $S_2$ and a second valve having a piston $P_2$, the piston being serially connected to said spring $S_2$ and a potentiometer $Pot_2$, wherein correlation between the areas of the pistons and the spring constants when a displacement ratio has been chosen, satisfies the following formula:

$$\frac{\Delta X_1}{\Delta X_2} = \frac{(P_{11}-P_{12})A_1 K_{S2}}{(P_{21}-P_{22})A_2 K_{S1}} = \frac{A_1 K_{S2}}{A_2 K_{S1}} = \frac{N_2}{N_1}$$

where:

$\Delta X_1$, $\Delta X_2$ = amount of displacement of pistons $P_1$, $P_2$.
$P_{11}$, $P_{12}$ = pressure on two sides of piston $P_1$.
$P_{21}$, $P_{22}$ = pressure on two sides of piston $P_2$.
$A_1$, $A_2$ = area of pistons $P_1$, $P_2$.
$K_{S1}$, $K_{S2}$ = spring constants of $S_1$, $S_2$.
$N_1$, $N_2$ = constant of proportionality for $Pot_1$, $Pot_2$.

9. Apparatus according to claim 8, wherein said comparing means includes a mixer the output of which is equal to zero when:

$$|e_1| = |e_2|$$

where $e_1$ is the voltage derived from said first means and $e_2$ is the voltage derived from said second means.

10. Apparatus according to claim 9, wherein to avoid possible oscillations, means are provided to adjust said mixer so that the output voltage of the mixer will be zero for:

$$|e_1| = K|e_2|$$

where K is a coefficient of proportionality slightly different from one.

References Cited

UNITED STATES PATENTS

| | | | |
|---|---|---|---|
| 3,124,368 | 3/1964 | Corley et al. | 280—6 |
| 3,257,122 | 6/1966 | Vogel | 267—34 X |

A. HARRY LEVY, Primary Examiner.

U.S. Cl. X.R.

267—34; 280—6